United States Patent
Kasaba et al.

(10) Patent No.: US 9,365,152 B2
(45) Date of Patent: Jun. 14, 2016

(54) VEHICLE LAMP CONTROL APPARATUS

(71) Applicant: KOITO MANUFACTURING CO., LTD., Tokyo (JP)

(72) Inventors: Yusuke Kasaba, Shizuoka (JP); Masashi Yamazaki, Shizuoka (JP); Atsushi Toda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/685,084

(22) Filed: Apr. 13, 2015

(65) Prior Publication Data

US 2015/0291082 A1    Oct. 15, 2015

(30) Foreign Application Priority Data

Apr. 14, 2014 (JP) ................. 2014-082526

(51) Int. Cl.
*B60Q 1/115* (2006.01)
*B60Q 1/00* (2006.01)

(52) U.S. Cl.
CPC ............. *B60Q 1/115* (2013.01); *B60Q 1/0023* (2013.01); *B60Q 2300/116* (2013.01); *B60Q 2300/132* (2013.01); *B60Q 2300/324* (2013.01)

(58) Field of Classification Search
CPC ............... B60Q 1/115; B60Q 1/0023; B60Q 2300/116; B60Q 2300/324; B60Q 2300/132
USPC ................ 701/49; 362/463–466; 382/104
See application file for complete search history.

(56) References Cited

U.S. PATENT DOCUMENTS

| 5,907,196 | A | * | 5/1999 | Hayami | F21S 48/1742 307/10.8 |
| 6,450,673 | B1 | * | 9/2002 | Toda | B60Q 1/115 362/464 |
| 6,663,268 | B1 | * | 12/2003 | Toda | B60Q 1/115 362/271 |
| 2001/0019225 | A1 | * | 9/2001 | Toda | B60Q 1/115 307/10.8 |
| 2011/0317439 | A1 | | 12/2011 | Yamazaki et al. | |
| 2012/0002430 | A1 | | 1/2012 | Yamazaki et al. | |

FOREIGN PATENT DOCUMENTS

JP    2012-030782 A    2/2012
JP    2012-030783 A    2/2012

* cited by examiner

*Primary Examiner* — Marthe Marc-Coleman
(74) *Attorney, Agent, or Firm* — Osha Liang LLP

(57) ABSTRACT

There is provided a vehicle lamp control apparatus including a receiver and a controller. The receive receives an output value of an inclination sensor and a signal output from at least one of a foot brake sensor, a parking brake sensor and a shift position sensor. A total angle which is an inclination angle of a vehicle with respect to a horizontal plane can be derived from the output value of the inclination sensor. The controller adjusts an optical axis angle of a vehicle lamp using the output value of the inclination sensor. The controller outputs an adjustment signal to adjust the optical axis angle of the vehicle lamp in response to change in the total amount when the vehicle is static, except for non-static load change caused by changeover in at least one of a foot brake, a parking brake and a shift position.

4 Claims, 4 Drawing Sheets

VEHICLE LAMP CONTROL APPARATUS

CROSS-REFERENCE TO RELATED APPLICATIONS

The present application claims the benefit of priority of Japanese Patent Application No. 2014-082526, filed on Apr. 14, 2014, the content of which is incorporated herein by reference.

TECHNICAL FIELD

Aspects of the present invention relate to a vehicle lamp control apparatus, and particularly to a vehicle lamp control apparatus for use in an automobile or the like.

BACKGROUND

There has been known an auto-leveling control in which a position of an optical axis of a vehicle headlamp is adjusted automatically in accordance with an inclination angle of a vehicle so as to change an illumination direction of the headlamp.

In the auto-leveling control, the position of the optical axis of the headlamp may be adjusted based on a pitch angle of the vehicle which is derived from an output value of a vehicle height sensor. On the other hand, JP 2012-030782 A (corresponding to U.S. 2012/0002430 A1) and JP 2012-030783 A (corresponding to U.S. 2011/0317439 A1) describe a vehicle lamp control apparatus in which auto-leveling control is carried out using an inclination sensor such as an acceleration sensor.

SUMMARY

When an inclination sensor such as an acceleration sensor is used, an auto-leveling system can be produced at a lower price and with lighter weight than the case where a vehicle height sensor is used. As a result, the vehicle can be made lower in cost and lighter in weight. On the other hand, even if the acceleration sensor is used, there is a demand to perform the auto-leveling control with a high accuracy.

An aspect of the present invention has been made in view of the above circumstances and provides a technique for enhancing an accuracy of an auto-leveling control for a vehicle lamp.

According to an illustrative embodiment of the present invention, there is provided a vehicle lamp control apparatus including a receiver configured to receive an output value of an inclination sensor and a signal output from at least one of a foot brake sensor, a parking brake sensor and a shift position sensor, wherein a total angle which is an inclination angle of a vehicle with respect to a horizontal plane is derivable from the output value of the inclination sensor, and the total angle includes a road surface angle which is an inclination angle of a road surface with respect to the horizontal plane and a vehicle posture angle which is an inclination angle of the vehicle with respect to the road surface, and a controller configured to adjust an optical axis angle of a vehicle lamp using the output value of the inclination sensor. The controller is configured to output an adjustment signal to adjust the optical axis angle of the vehicle lamp in response to change in the total amount when the vehicle is static, except for non-static load change caused by changeover in at least one of a foot brake, a parking brake and a shift position. The controller is configured to avoid outputting the adjustment signal or output a maintaining signal to maintain the optical axis angle in response to the non-static load change when the vehicle is static and change in the total angle when the vehicle is running With this configuration, an accuracy of the auto-leveling control for a vehicle lamp can be enhanced.

In the above vehicle lamp control apparatus, the controller may be configured to repeatedly derive the total angle from the output value when the vehicle is static, and the controller may be configured to avoid outputting the adjustment signal or output the maintaining signal in response to change between the total angle derived at a previous time and the total angle derived at a current time when the receiver receives at least one of a changeover signal for the foot brake, a changeover signal for the parking brake and a changeover signal for the shift position in a time period from the previous time of deriving the total angle to the current time of deriving the total angle.

With this configuration, an accuracy of the auto-leveling control for a vehicle lamp can be also enhanced.

Further, the controller may be configured to store a reference value of the road surface angle and a reference value of the vehicle posture angle. When the vehicle is static, in a case where the receiver does not receive the changeover signal in the period starting from the previous time of deriving the total angle to the current time of deriving the total angle, the controller may subtract the reference value of the road surface angle from the total angle derived at the current time so as to obtain the vehicle posture angle, store the obtained vehicle posture angle as a new reference value of the vehicle posture angle and output the adjustment signal based on the obtained vehicle posture angle or the new reference value of the vehicle posture angle, and in a case where the receiver receives the changeover signal in the period starting from the previous time of deriving the total angle to the current time of deriving the total angle, the controller may subtract the reference value of the vehicle posture angle from the total angle derived at the current time so as to obtain the road surface angle and store the obtained road surface angle as a new reference value of the road surface angle. When the vehicle is stopping, the controller may derive the total angle from the output value, subtract the reference value of the vehicle posture angle from the derived total angle to obtain the road surface angle, and store the obtained road surface angle as a new reference value of the road surface value.

With this configuration, an accuracy of the auto-leveling control for a vehicle lamp can be also enhanced.

Further, in the above vehicle lamp control apparatus, the controller may be configured to avoid outputting the adjustment signal or output the maintaining signal in response to non-static load change caused by changeover in the foot brake when the vehicle is static.

With this configuration, an accuracy of the auto-leveling control for a vehicle lamp can be surely enhanced.

Suitable combinations of some of the above-described components are also included in the scope of the present invention.

According to the above configurations, it is possible to provide a technique for enhancing an accuracy of an auto-leveling control for a vehicle lamp.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Figure 1:
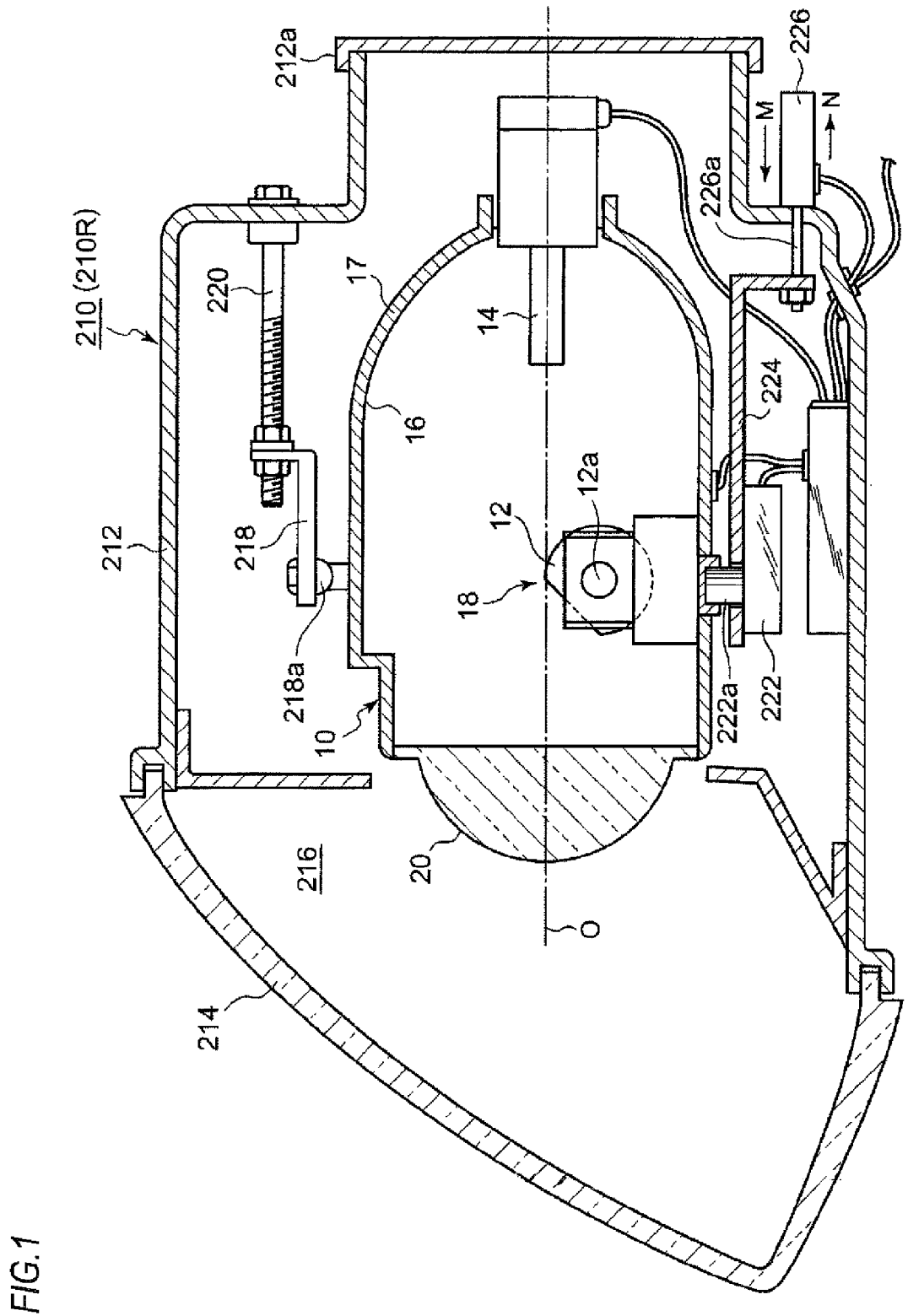
FIG. 1 is a schematic vertical section view of a headlamp unit including a vehicle lamp to be controlled by a vehicle lamp control apparatus according to an illustrative embodiment.

Illustrative embodiments will be described below with reference to the accompanying drawings. Constituent elements, members and/or steps which are shown in the drawings and which are the same as or equivalent to each other may be given the same reference signs. Also, redundant description thereon may be omitted accordingly. It should be noted that the illustrative embodiments described below do not limit the scope of the invention and are just exemplary or illustrative. All of features described below or any combination thereof may not be always essential for the present invention.

In this specification, An expression "when a vehicle is running" mean, for example, a state in which a vehicle is during a period from a time when a detection value of a vehicle speed sensor 312 (which will be described later) exceeds 0 to a time when the detection value of the vehicle speed sensor 312 reaches 0. An expression "when a vehicle is stopping" means, for example, a state in which a vehicle is at a time when a detection value of an acceleration sensor 110 (which will be described later) becomes stable after the detection value of the vehicle speed sensor 312 reaches 0. An expression "when a vehicle is static" means, for example, a state in which a vehicle is during a period from a time when the detection value of the acceleration sensor 110 becomes stable to a time when the detection value of the vehicle speed sensor 312 exceeds 0. It is also noted that a state in which "a vehicle stops" includes both of (i) a state in which "the vehicle is static" and (ii) a state in which "the vehicle is stopping."

FIG. 1 is a schematic vertical section view of a headlamp unit including a vehicle lamp to be controlled by a vehicle lamp control apparatus according to an illustrative embodiment. A headlamp unit 210 includes a pair of headlamp units 210R, 210L which are formed horizontally symmetrically. The headlamps 210R, 210L are respectively disposed in right and left sides, in a vehicle width direction, of a vehicle.

The right headlamp unit 210R and the left headlamp unit 210L have substantially the same configuration. Therefore, the structure of the right headlamp unit 210R will be described below.

The headlamp unit 210R has a lamp body 212 and a transparent cover 214. The lamp body 212 is formed with an opening portion on a vehicle front side. The transparent cover 214 covers the opening portion of the lamp body 212. The lamp body 212 has a detachable cover 212a on a vehicle rear side. A lamp chamber 216 is defined by the lamp body 212 and the transparent cover 214. The lamp chamber 216 houses a lamp unit 10 which serves as a vehicle lamp.

A lamp bracket 218 having a pivot mechanism 218a is connected to the lamp unit 10. The lamp unit 10 can vertically and horizontally swing about the pivot mechanism 218a. The lamp bracket 218 is screwed with an aiming adjustment screw 220 supported on the lamp body 212. A rotary shaft 222a of a swivel actuator 222 is fixed to a lower surface of the lamp unit 10. The swivel actuator 222 is fixed to a unit bracket 224. A leveling actuator 226 is connected to the unit bracket 224. The leveling actuator 226 includes, for example, a motor or the like that expands and contracts a rod 226a in directions indicated by arrows M, N. When the rod 226a is expanded or contracted in the directions indicated by the arrows M, N, the lamp unit 10 has a backward inclined posture or a forward inclined posture. Thereby, a leveling adjustment which directs a pitch angle of an optical axis O downward or upward can be performed.

The lamp unit 10 includes a shade mechanism 18, a light source 14, a lamp housing 17, and a projection lens 20. The shade mechanism 18 includes a rotary shade 12. The lamp housing 17 supports a reflector 16 on its inner wall. Examples of the light source 14 include an incandescent bulb, a halogen lamp, a discharge lamp, an LED and the like. At least a portion of the reflector 16 has an elliptic sphere shape. The reflector 16 reflects light emitted from the light source 14. A part of the light emitted from the light source 14 and a part of the light reflected by the reflector 16 are guided to the projection lens 20 through the rotary shade 12. The rotary shade 12 is a cylindrical member that is rotatable about a rotation shaft 12a. The rotary shade 12 is formed with a notch portion and includes a plurality of shade plates (not shown). The notch portion or one of the shade plates is moved so as to be located on the optical axis O, and thereby a predetermined light distribution pattern is formed. The projection lens 20 includes a plano-convex aspherical lens. A light source image formed on a rear focal plane is projected as an inverted image onto a virtual vertical screen ahead of the lamp.

Figure 2:
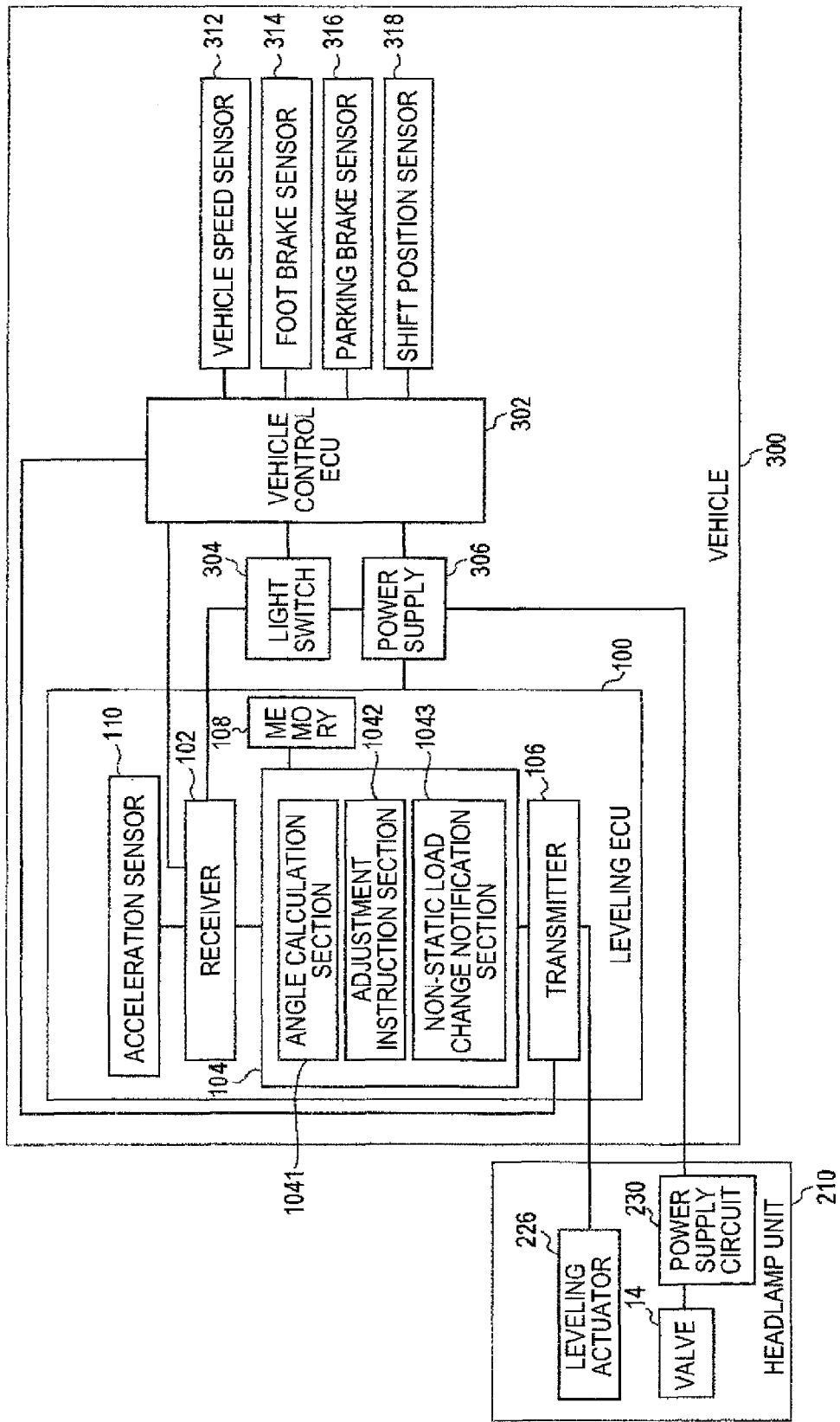
FIG. 2 is a functional block diagram for explaining cooperation among the headlamp unit, a vehicle control ECU and the vehicle lamp control apparatus.

FIG. 2 is a functional block diagram for explaining cooperation among the headlamp unit, a vehicle control ECU and the vehicle lamp control apparatus. In FIG. 2, the headlamp unit 210R and the headlamp unit 210L are collectively referred to as the "headlamp unit 210." Also, a leveling ECU 100 and a vehicle control ECU 302 may be implemented by a hardware configuration and/or a software configuration. The hardware configuration may include elements and circuits such as a CPU and a memory of a computer. The software configuration may include computer programs. FIG. 2 shows the leveling ECU 100 and the vehicle control ECU 302 as functional blocks which are implemented by cooperation of the hardware configuration and the software configuration. One skilled in the art would appreciate that such functional blocks may be implemented in various manners using combinations of hardware and software.

The leveling ECU 100 is an example of a vehicle lamp control apparatus.

The leveling ECU 100 includes a receiver 102, a controller 104, a transmitter 106, a memory 108 and an acceleration sensor 110 which is an example of an inclination sensor. The leveling ECU 100 is, for example, installed near a dashboard of a vehicle 300. It should be noted that the installation position of the leveling ECU 100 is not limited thereto. The leveling ECU 100 may be disposed, for example, inside the headlamp unit 210. Also, the acceleration sensor 110 may be provided outside the leveling ECU 100.

The vehicle control ECU 302 and a light switch 304 are connected to the leveling ECU 100. A vehicle speed sensor 312, a foot brake sensor 314, a parking brake sensor 316 and a shift position sensor 318 are connected to the vehicle control ECU 302. The vehicle control ECU 302 can acquire various kinds of information from those sensors or the like and transmit the acquired information to the leveling ECU 100. For example, the vehicle control ECU 302 transmits an output value of the vehicle speed sensor 312 to the leveling ECU 100. Thus, the leveling ECU 100 can detect the running state of the vehicle 300.

The foot brake sensor 314 outputs a signal indicating an ON/OFF changeover in a foot brake. The parking brake sensor 316 outputs a signal indicating an ON/OFF changeover in a parking brake. The shift position sensor 318 outputs a signal indicating a changeover in a shift position. The light switch 304 transmits an instruction signal to turn on/off the headlamp unit 210, an instruction signal to execute auto-leveling control or the like to a power supply 306, the vehicle control ECU 302, the leveling ECU 100 and/or the like, in accordance with the driver's operation.

A signal output from the vehicle control ECU 302 or the light switch 304 to the leveling ECU 100 is received by the receiver 102. The receiver 102 also receives an output value of the acceleration sensor 110. Each signal received by the receiver 102 is transmitted to the controller 104. The controller 104 adjusts an optical axis angle θo of the lamp unit 10 using the output value of the acceleration sensor 110.

The controller 104 has an angle calculation section 1041, an adjustment instruction section 1042 and a non-static load change notification section 1043. The angle calculation section 1041 generates pitch angle information of the vehicle 300 using the output value of the acceleration sensor 110 and information stored in the memory 108 if necessary. The adjustment instruction section 1042 generates an adjustment signal for adjusting the optical axis angle θo of the lamp unit 10 using the pitch angle information generated by the angle calculation section 1041. The adjustment instruction section 1042 also generates a maintaining signal for maintaining the optical axis angle θo in response to an instruction from the angle calculation signal 1041. When a non-static load change occurs due to a changeover in at least one of the foot brake, the parking brake and the shift position, the non-static load change notification section 1043 outputs a signal indicating the occurrence of the non-static load change to the angle calculation section 1041.

The controller 104 outputs the adjustment signal or the maintaining signal to the leveling actuator 226 through the transmitter 106. The leveling actuator 226 is driven based on the received adjustment signal, so as to adjust the optical axis O of the lamp unit 10 with respect to the pitch angle direction. When the maintaining signal is received, the leveling actuator 226 is not driven and the optical axis angle θo is maintained. The contents of auto-leveling control performed by the controller 104 and the operation of each section of the controller 104 will be described later in detail.

The power supply 306 is mounted on the vehicle 300. The power supply 306 supplies electric power to the leveling ECU 100, the vehicle control ECU 302 and the headlamp unit 210. For example, when an instruction to light on the headlamp unit 210 is given by operation on the light switch 304, electric power is supplied to the light source 14 from the power supply 306 through a power supply circuit 230.

Figure 3:
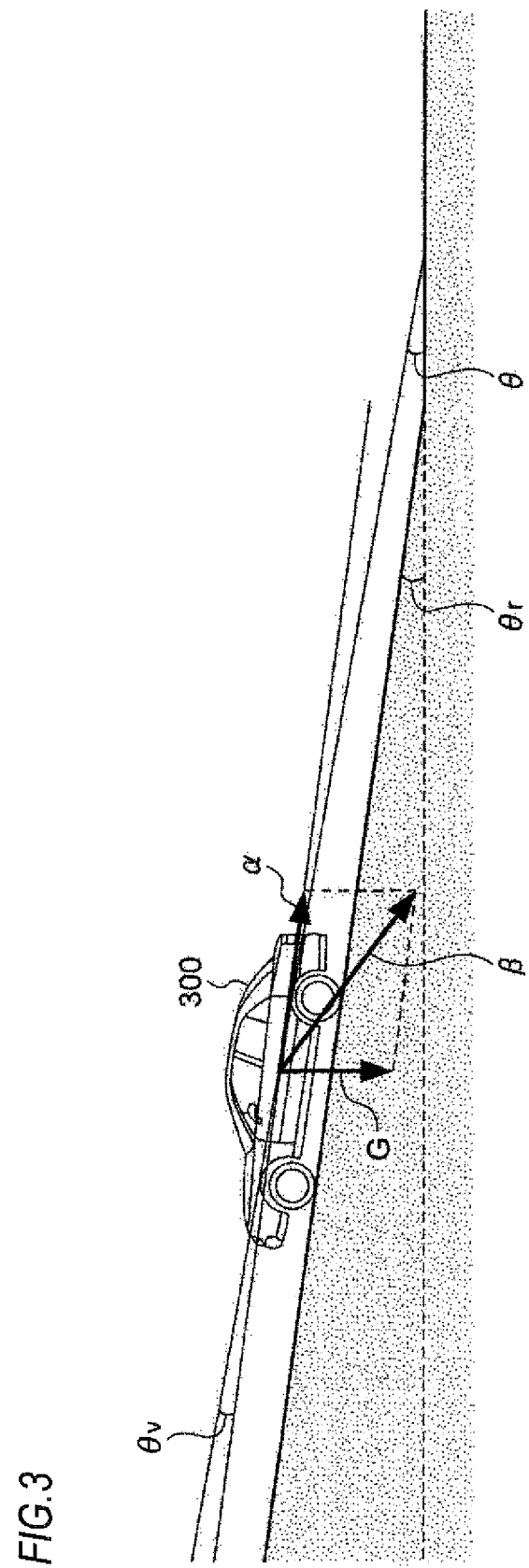
FIG. 3 is a schematic view for explaining (i) acceleration vectors generated in a vehicle and (ii) an inclination angle of the vehicle which can be detected by an inclination sensor.

Next, the auto-leveling control executed by the leveling ECU 100 having the above configuration will be described. FIG. 3 is a schematic view for explaining (i) acceleration vectors generated in the vehicle 300 and (ii) the inclination angle of the vehicle 300 which can be detected by the acceleration sensor 110.

For example, when a luggage is loaded on a rear portion of the vehicle or when a passenger is on a rear seat, the vehicle has a backward inclined posture. When the luggage is unloaded or when the passenger on the rear seat gets off, the vehicle in the backward inclined posture inclines forward. The illumination direction of the lamp unit 10 also changes vertically according to the posture of the vehicle 300 which leads to a change in forward illumination distance. Then, the leveling ECU 100 derives the inclination angle of the vehicle 300 in the pitch direction or a change of the inclination angle of the vehicle 300 in the pitch direction, from the output values of the acceleration sensor 110, and sets the pitch angle of the optical axis O to be an angle corresponding to the vehicle posture. When the auto-leveling control for performing the leveling adjustment of the lamp unit 10 in real time based on the vehicle posture is executed, a reaching distance of the forward illumination light can be adjusted optimally even if the vehicle posture is changed.

The acceleration sensor 110 is, for example, a three-axis acceleration sensor having an X axis, a Y axis and a Z axis which are orthogonal to each other, as sensor axes. The acceleration sensor 110 is mounted on the vehicle 300 in a desired posture. The acceleration sensor 110 detects acceleration vectors generated in the vehicle 300. During running of the vehicle 300, a gravitational acceleration and a motion acceleration caused by movement of the vehicle 300 are generated in the vehicle 300. Therefore, the acceleration sensor 110 can detect a composite acceleration vector β obtained by combining (adding) a gravitational acceleration vector G and a motion acceleration vector a, as shown in FIG. 3. Also, the acceleration sensor 110 can detect the gravitational acceleration vector G when the vehicle 300 is static. The acceleration sensor 110 outputs numerical values of respective components of the detected acceleration vector in the X-axis, the Y-axis and the Z-axis.

Numerical values of components along the X-axis, the Y-axis and the Z-axis (components in the sensor coordinate system) output from the acceleration sensor 110 are converted into components in the front-rear axis, the left-right axis and the vertical axis (components in the vehicle coordinate system) of the vehicle 300 by the angle calculation section 1041 of the controller 104. Reference axis information indicating the positional relationship among the axes of the acceleration sensor 110 mounted on the vehicle 300, the axes of the vehicle 300 and a road surface angle is stored in the memory 108 in advance. Using the reference axis information, the angle calculation section 1041 can convert components in the sensor coordinate system into components in the vehicle coordinate system.

The inclination of the vehicle 300 with respect to the gravitational acceleration vector G can be derived from the detection value of the acceleration sensor 110 when the vehicle is static. That is, a total angle θ including a road surface angle θr and a vehicle posture angle θv can be derived from the output value of the acceleration sensor 110. The road surface angle θr is an inclination angle of a road surface with respect to the horizontal plane. The vehicle posture angle θv is an inclination angle of the vehicle 300 with respect to the road surface. The total angle θ is an inclination angle of the vehicle 300 with respect to the horizontal plane. Incidentally, the road surface angle θr, the vehicle posture angle θv and the total angle θ are angles in the pitch direction of the vehicle 300.

An object of the auto-leveling control is to absorb a change in the forward illumination distance of the vehicle lamp caused by a change in the pitch-direction inclination angle of the vehicle 300 to thereby keep the forward reach distance of illumination light optimal. Therefore, the inclination angle of the vehicle 300 required for the auto-leveling control is the vehicle posture angle θv. That is, in the auto-leveling control, it is desired that the optical axis angle θo of the lamp unit 10 is adjusted when there is a change in the vehicle posture angle θv, and the optical axis angle θo of the lamp unit 10 is maintained when there is a change in the road surface angle θr. In order to realize this, it is necessary to extract information about the vehicle posture angle θv from the total angle θ.

Incidentally, as basic auto-leveling control, the controller 104 estimates the change in the total angle θ as the change in the road surface angle θr when the vehicle is running and estimates the change in the total angle θ as the change in the vehicle posture angle θv when the vehicle is static. Accordingly, the vehicle posture angle θv is derived from the total angle θ. When the vehicle is running, the vehicle posture angle θv rarely changes due to increase/decrease in the mounted load or the number of passengers. Therefore, the change in the total angle θ when the vehicle is running may be estimated as the change in the road surface angle θr. On the other hand, when the vehicle is static, the road surface angle θr rarely changes due to movement of the vehicle 300. Therefore, the change in the total angle θ when the vehicle is static may be estimated as the change in the vehicle posture angle θv. The change in the total angle θ caused by increase/decrease in the mounted load or the number of passengers will be referred to as a static load change.

Specifically, the vehicle 300 is placed on a horizontal surface in a manufacturing factory of a vehicle maker, a maintenance factory of a dealer, or the like.

That is, the vehicle 300 is set in a reference state. Then, an initialization signal is transmitted, for example, by operation on a switch of an initialization processing apparatus in the factory or communication via a Controller Area Network (CAN) system. In the initialization processing, initial aiming adjustment is performed to adjust the optical axis θ of the lamp unit 10 to an initial angle. In addition, the angle calculation section 1041 stores and holds, in a RAM or the memory 108, the output value of the acceleration sensor 110 in the reference state as a reference value)(θr=0°) of the road surface angle θr and a reference value (θv=0°) of the vehicle posture angle θv.

In the situation where the vehicle 300 is put into practical use, the controller 104 avoids adjusting the optical axis angle θo or makes adjustment to maintain the optical axis angle θo for a change in the total angle θ when the vehicle is running The change in the total angle θ is recorded as a change in the road surface angle θr. Specifically, the angle calculation section 1041 calculates the total angle θ at current time (when the vehicle is stopping) from the output value of the acceleration sensor 110 when the vehicle is stopping. Next, the angle calculation section 1041 subtracts the reference value of the vehicle posture angle θv from the current total angle θ so as to obtain the road surface angle θr (θr=θ−θv reference value). Then, the stored reference value of the road surface angle θr is updated with the obtained road surface angle θr as a new reference value of the road surface angle θr. In addition, the angle calculation section 1041 gives the adjustment instruction section 1042 an instruction to generate a maintaining signal for maintaining the optical axis angle θo. In response to the instruction from the angle calculation section 1041, the adjustment instruction section 1042 generates and outputs a maintaining signal. Thus, the optical axis angle θo is maintained at a current angle.

Incidentally, the adjustment instruction section 1042 may avoid outputting the adjustment signal to avoid adjusting the optical axis angle θo in order to keep the optical axis angle θo at the current angle. For example, when the angle calculation section 1041 does not transmit information about the vehicle posture angle θv to the adjustment instruction section 1042, the adjustment instruction section 1042 can avoid generating the adjustment signal to thereby avoid outputting the adjustment signal.

Alternatively, when a signal for inhibiting the output of the adjustment signal is transmitted to the adjustment instruction section 1042 by the angle calculation section 1041, the adjustment instruction section 1042 can generate an adjustment signal but avoid outputting the adjustment signal.

In this manner, the change in the total angle θ when the vehicle is running is estimated as the change in the road surface angle θr and incorporated into the reference value of the road surface angle θr. Incidentally, as mentioned above, for example, the expression "when the vehicle is running" means a state in which a vehicle is during a period from a time when a detection value of the vehicle speed sensor 312 exceeds 0 to a time when the detection value of the vehicle speed sensor 312 reaches 0. The expression "when vehicle is stopping" means, for example, a state in which a vehicle is at a time when a detection value of the acceleration sensor 110 becomes stable after the detection value of the vehicle speed sensor 312 reaches 0. The expression "when the vehicle is running" and "when the vehicle is stopping" may be set suitably based on experiments or simulations carried out a designer.

The controller 104 outputs an adjustment signal for adjusting the optical axis angle θo in response to the change in the total angle θ when the vehicle is static. Specifically, when the vehicle is static, the angle calculation section 1041 repeatedly derives the current total angle θ from the output value of the acceleration sensor 110 at a predetermined timing. The derived total angle θ is stored. Then, the angle calculation section 1041 subtracts the reference value of the road surface angle θr from the current total angle θ to obtain the vehicle posture angle θv (θv=θ−θr reference value). The stored reference value of the vehicle posture angle θv is updated with the obtained vehicle posture angle θv as a new reference value of the vehicle posture angle θv.

Accordingly, the change in the total angle θ when the vehicle is running is estimated as the change in the vehicle posture angle θv and incorporated into the reference value of the vehicle posture angle 0v. Incidentally, as mentioned above, the expression "when the vehicle is static" means, for example, a state in which a vehicle is during a period from a time when the detection value of the acceleration sensor 110 becomes stable to a time when the detection value of the vehicle speed sensor 312 exceeds 0. The expression "when the vehicle is static" may be set suitably based on experiments or simulations carried out a designer.

The angle calculation section 1041 transmits the calculated vehicle posture angle θv or the updated reference value of the vehicle posture angle θv to the adjustment instruction section 1042. Then, the adjustment instruction section 1042 generates an adjustment signal for the optical axis angle θo using the calculated vehicle posture angle θv or the updated reference value of the vehicle posture angle θv. For example, the adjustment instruction section 1042 decides the optical axis angle 0o and generates an adjustment signal, using a conversion table in which the vehicle posture angle θv and the optical axis angle θo are associated with each other. The conversion table is stored in the memory 108 in advance. The generated adjustment signal is output to the leveling actuator 226 through the transmitter 106.

In the above basic auto-leveling control, the change in the total angle θ when the vehicle is static is estimated as the change in the vehicle posture angle θv. However, a change in the total angle θ which is not a static load change, that is, a change in the total angle θ which should be excluded from an object for adjustment of the optical axis angle θo may occur even when the vehicle is static. An example of such a change in the total angle θ which is not a static load change may include a change caused by a changeover in at least one of the foot brake, the parking brake and the shift position. Such a change in the total angle θ will be referred to as non-static load change. The non-static load change is generated by application or cancel of braking force to or from wheels due to ON/OFF of the foot brake or the parking brake, application, change in application direction or cancel of driving torque to or from the wheels due to a changeover in the shift position, or a combination of those.

Specifically, for example, when the vehicle stops, the foot brake is typically turned ON to decelerate the vehicle 300 in the state where the parking brake is OFF and the shift position is a drive position (hereinafter referred to as D position).

When the vehicle 300 stops completely, the parking brake is changed over to ON, and the shift position is changed over from the D position to a parking position (hereinafter referred to as P position). After that, the foot brake is changed over to OFF. When the foot brake is changed over from ON to OFF in the state where the parking brake is ON and the shift position is the P position, braking force given to the wheels by the foot brake may be canceled to generate a change in the total angle θ, that is, a non-static load change. When the foot brake is changed over from ON to OFF, a non-static load change may occur whenever the shift position is the P position, the D position, a reverse position (hereinafter referred to as R position), a neutral position (hereinafter referred to as N position), or the like.

A non-static load change may also occur when the parking brake is changed over to OFF in the state where the foot brake is OFF, the parking brake is ON and the shift position is the P position after the vehicle 300 has stopped. Further, a non-static load change may also occur when the parking brake is changed over to OFF in the state where the foot brake is ON, the parking brake is ON and the shift position is the P position or when the foot brake is changed over to OFF in the state where the foot brake is ON, the parking brake is OFF and the shift position is the P position. Further, a non-static load change may also occur when the shift position is changed over in the state where both the foot brake and the parking brake are ON, in the state where the foot brake is OFF and the parking brake is ON, or in the state where the foot brake is ON and the parking brake is OFF. It will be appreciated by one skilled in the art that a non-static load change may occur due to changeovers in the foot brake, the parking brake and the shift position even in other situations than the above situations.

Such non-static load changes frequently occur when the vehicle is static. Therefore, when the optical axis is adjusted in response to the non-static load changes when the vehicle is static, detection errors in the acceleration sensor 110 and so on may be accumulated extremely to deteriorate the accuracy of the auto-leveling control. If the road where the vehicle 300 is located is a slope, the vehicle 300 may move down the slope slightly though the parking brake is ON or the shift position is the P position when the foot brake is, for example, changed over from ON to OFF. In this case, the road surface angle θr may change and appear as a change in the total angle θ. However, since the change in the road surface angle θr is a change when the vehicle is static, the change is regarded as a change in the vehicle posture angle θv in the basic auto-leveling control. Such a change in the total angle θ caused by a change in the road surface angle θr appearing due to the fact that the vehicle 300 is located on a slope is also included as a non-static load change.

Therefore, the controller 104 outputs an adjustment signal to adjust the optical axis angle θo in response to change in the total angle θ when the vehicle is static, except for the non-static load change caused by changeover in at least one of the foot brake, the parking brake and the shift position. On the other hand, the controller 104 outputs a maintaining signal to avoid outputting the adjustment signal or maintain the optical angle θo in response to any non-static load change when the vehicle is static and any change in the total angle θ when the vehicle is running Specifically, the angle calculation section 1041 derives the total angle θ from the output value of the acceleration sensor 110 repeatedly when the vehicle is static. The non-static load change notification section 1043 transmits a non-static load change occurrence signal to the angle calculation section 1041 in response to a foot brake changeover signal received from the foot brake sensor 314 when the vehicle is static. The non-static load change notification section 1043 also transmits a non-static load change occurrence signal to the angle calculation section 1041 in response to a parking brake changeover signal received from the parking brake sensor 316 or in response to a shift position changeover signal received from the shift position sensor 318 when the vehicle is static.

In a period starting from a previous time of deriving the total angle θ to a current time of deriving the total angle θ, when the angle calculation section 1041 receives the non-static change occurrence signal from the non-static load change notification section 1043, that is, when the controller 104 receives at least one of the foot brake changeover signal, the parking brake changeover signal and the shift position changeover signal, the angle calculation section 1041 gives the adjustment instruction section 1042 an instruction to generate a maintaining signal. In response to the instruction, the adjustment instruction section 1042 outputs a maintaining signal. As a result, it is possible to avoid changing the optical axis angle θo in response to change of the total angle θ at the current time from the total angle θ at the previous time, that is, a non-static load change when the vehicle is static. Incidentally, the adjustment instruction section 1042 may avoid outputting the adjustment signal to maintain the current angle of the optical axis angle θo. The "change of the total angle θ at the current time from the total angle θ at the previous time" is equal to a difference between the vehicle posture angle θv obtained by subtracting the reference value of the road surface angle θr from the total angle θ at the previous time and the vehicle posture angle θv obtained by subtracting the reference value of the road surface angle θr from the total angle θ at the current time.

In the period starting from the previous time of deriving the total angle θ to the current time of deriving the total angle θ, when the angle calculation section 1041 does not receive the non-static load change occurrence signal from the non-static load change notification section 1043, that is, when the controller 104 does not receive any one of the foot brake changeover signal, the parking brake changeover signal and the shift position changeover signal, the angle calculation section 1041 executes the basic auto-leveling control. That is, the angle calculation section 1041 stores the vehicle posture angle θv obtained by subtracting the reference value of the road surface angle θr from the total angle θ derived at the current time, as a new reference value of the vehicle posture angle θv. Then, the adjustment instruction section 1042 outputs an adjustment signal based on the obtained vehicle posture angle θv or the new reference value of the vehicle posture angle θv.

The basic auto-leveling control is executed in response to a change in the total angle θ when the vehicle is running That is, when the vehicle is stopping, the angle calculation section 1041 derives the total angle θ from the output value of the acceleration sensor 110, subtracts the reference value of the vehicle posture angle θv from the derived total angle θ to obtain the road surface angle θr, and stores the obtained road surface angle θr as a new reference value of the road surface angle θr.

In this manner, the controller 104 determines the difference between the value of the total angle θ obtained at the previous time and the value of the total angle θ obtained at the current time as a non-static load change when there is a changeover in at least one of the foot brake, the parking brake and the shift position in the period starting from the previous time of calculating the total angle θ to the current time of calculating the total angle θ. Then, the controller 104 avoids changing the optical axis angle θo in response to the non-static load change. Thus, changes in the total angle θ when the vehicle is static can be classified into static load changes which should be regarded as objects for adjustment of the optical axis and non-static load changes which should be excluded from the objects for adjustment of the optical axis, and the optical axis can be adjusted in response to only the static load changes. As a result, the accuracy of the auto-leveling control can be improved.

In addition, when the angle calculation section 1041 receives a non-static change occurrence signal in the period starting from the previous time of deriving the total angle θ to the current time of deriving the total angle θ, the angle calculation section 1041 does not only maintain the optical axis angle θo in spite of the change in the total angle θ but also subtracts the reference value of the vehicle posture angle θv from the total angle θ derived at the current time so as to calculate the road surface angle θr. The obtained road surface angle θr is stored as a new reference value of the road surface angle θr. In this manner, a non-static load change when the vehicle is static can be incorporated into the reference value of the road surface angle θr. As a result, the non-static load change can be eliminated in the calculation of the vehicle posture angle θv which will be performed for a future static load change occurring when the vehicle is static. It is therefore possible to further improve the accuracy of the auto-leveling control. Incidentally, an error in the non-static load change incorporated into the reference value of the road surface angle θr can be eliminated by the calculation of the road surface angle θr which will be performed next time when the vehicle is static.

Figure 4:
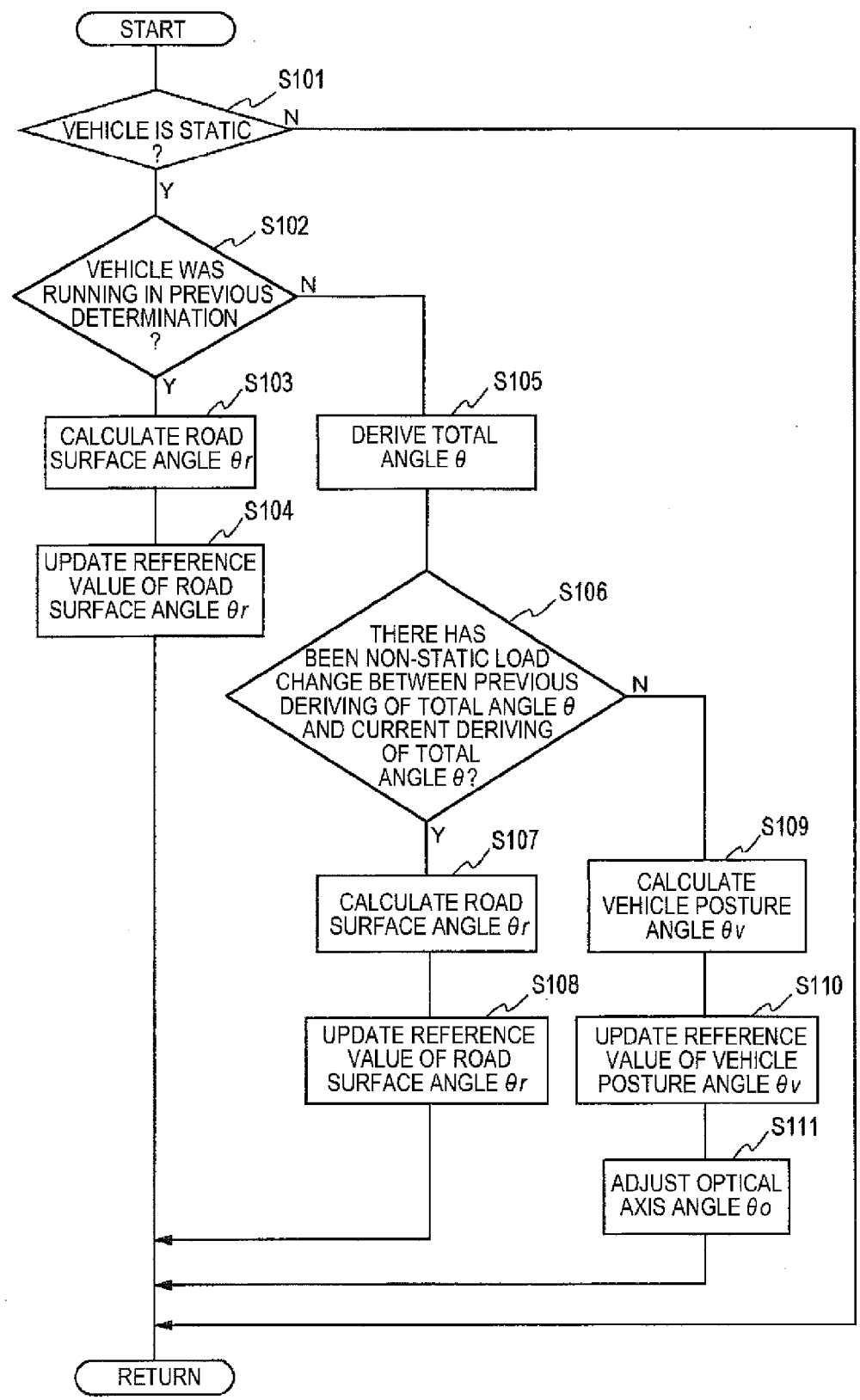
FIG. 4 is a flowchart of an auto-leveling control to be executed by the vehicle lamp control apparatus according to the illustrative embodiment.

FIG. 4 is a flow chart of the auto-leveling control to be executed by the vehicle lamp control apparatus according to the illustrative embodiment. This flow is executed repeatedly at a predetermined timing by the controller 104 when ignition is turned ON in the state where an instruction to execute an auto-leveling control mode has been, for example, given by the light switch 304. The flow is terminated when the ignition is turned OFF.

First, the controller 104 determines whether the vehicle 300 is static (S101). When the vehicle 300 is not static (N in S101), that is, when the vehicle 300 is running, the controller 104 terminates this routine. When the vehicle 300 is static (Y in S101), the controller 104 determines whether the vehicle was running (N in S101) in the vehicle static determination of the step S101 in the routine executed at the previous time (S102). When the vehicle 300 was running in the previous determination (Y in S102), the controller 104 subtracts the reference value of the vehicle posture angle θv from the current total angle θ so as to calculate the road surface angle θr (S103). The controller 104 updates the reference value of the road surface angle θr with the obtained road surface angle θr as a new reference value (S104), and terminates this routine.

That is, changing the optical axis angle θo in response to a change in the total angle θ when the vehicle is running is avoided.

When the vehicle 300 was not running in the previous determination (N in S102), the controller 104 derives the total angle θ (S105). Then the controller 104 determines whether there has been a non-static load change between the deriving of the total angle θ in the step S105 of the routine executed at the previous time and the deriving of the total angle θ executed likewise at the current time (S106). Whether there has been a non-static load change can be determined based on whether at least one of a foot brake changeover signal, a parking brake changeover signal and a shift position changeover signal has been received, that is, whether a non-static load change occurrence signal has been transmitted from the non-static load change notification section 1043 to the angle calculation section 1041. When there has been a non-static load change between the deriving of the total angle θ at the previous time and the deriving of the same at the current time (Y in S106), the controller 104 subtracts the reference value of the vehicle posture angle θv from the current total angle θ so as to calculate the road surface angle θr (S107). Then the controller 104 updates the reference value of the road surface angle θr with the obtained road surface angle θr as a new reference value (S108), and terminates this routine. Accordingly, changing the optical axis angle θo in response to a non-static load change occurring when the vehicle is static is avoided.

When there has been no non-static load change between the deriving of the total angle θ at the previous time and the deriving of the same at the current time (N in S106), the controller 104 subtracts the reference value of the road surface angle θr from the current total angle θ so as to calculate the vehicle posture angle θv (S109). Then, the controller 104 updates the reference value of the vehicle posture angle θv with the obtained vehicle posture angle θv as a new reference value of the vehicle posture angle θv (S110). The controller 104 adjusts the optical axis angle θo to an angle corresponding to the obtained reference value of the vehicle posture angle θv (S111), and terminates this routine.

As described above, in the leveling ECU 100 according to the illustrative embodiment, the optical axis angle θo is changed in response to change in the total angle θ when the vehicle is static except for the non-static load change, and changing the optical axis angle θo is avoided for the non-static load change when the vehicle is static and the change in the total angle θ when the vehicle is running Specifically, the controller 104 avoids changing the optical axis angle θo when receiving at least one of a foot brake changeover signal, a parking brake changeover signal and a shift position changeover signal in the period starting from the previous time of deriving the total angle θ to the current time of deriving the total angle θ. Thus, it is possible to suppress misalignment of the optical axis which may occur when the optical axis is adjusted in response to a non-static load change which should be excluded from objects for adjustment of the optical axis. It is therefore possible to enhance the accuracy of the auto-leveling control.

The present invention is not limited to the above illustrative embodiment. Modifications including various changes on the design may be made on the illustrative embodiment based on knowledge that those skilled in the art have. Any embodiment to which such a modification has been applied is also included in the scope of the present invention. A new embodiment produced by combination of the above illustrative embodiment and a modification has both the effect of the combined embodiment and the effect of the combined modification.

The leveling ECU 100 according to the above illustrative embodiment receives signals from the foot brake sensor 314, the parking brake sensor 316 and the shift position sensor 318, and determines all the reception of a foot brake changeover signal, the reception of a parking brake changeover signal and the reception of a shift position changeover signal as occurrence of non-static load changes. However, the present invention is not limited to this configuration. That is, the accuracy of the auto-leveling control can be improved in a configuration in which signals output from at least one of the foot brake sensor, the parking brake sensor and the shift position sensor can be received and changing the optical axis angle θo can be avoided for non-static load change caused by changeovers in at least one of the foot brake, the parking brake and the shift position.

Further, in the situation where the vehicle 300 is put into practical use, a non-static load change may often occur when the foot brake is changed over, in comparison with when the parking brake or the shift position is changed over. It is therefore preferable that changing the optical axis angle θo is avoided at least for a non-static load change caused by a changeover in the foot brake. Thus, the lowering of the accuracy of the auto-leveling control caused by the non-static load change can be suppressed more surely. Further, occurrence of a non-static load change may be determined only when a foot brake changeover signal is received while adjustment of the optical axis angle θo is executed as usual when a parking brake changeover signal or a shift position changeover signal is received. In this case, the auto-leveling control can be simplified while suppressing the lowering of the accuracy of the auto-leveling control.

In the above illustrative embodiment, the reference value of the road surface angle θr is subtracted from the total angle θ to update the reference value of the vehicle posture angle θv, and the reference value of the vehicle posture angle θv is subtracted from the total angle θ to update the reference value of the road surface angle θr. However, the reference values may be updated as follows.

That is, the angle calculation section 1041 calculates a difference Δθ1 in the total angle θ (change in the total angle θ) before and after the vehicle runs when the vehicle is stopping. Then, the difference Δθ1 is added to the reference value of the road surface angle θr to obtain a new reference value of the road surface angle θr (new θr reference value=θr reference value+Δθ1) and update the reference value of the road surface angle θr therewith. The angle calculation section 1041 may calculate the difference Δθ1 as follows. That is, just after start of the vehicle 300, the angle calculation section 1041 stores the total angle θ obtained just before the start as a reference value of the total angle θ. Then, when the vehicle is stopping, the angle calculation section 1041 subtracts the reference value of the total angle θ from the current (when the vehicle is stopping) total angle θ so as to calculate the difference Δθ1. The expression "just after start" means, for example, a predetermined period after the detection value of the vehicle speed sensor 312 exceeds 0. The expression "just before start" means, for example, a predetermined time before the detection value of the vehicle speed sensor 312 exceeds 0. The "just after start" and the "just before start" may be set appropriately based on experiments or simulations carried out by the designer.

Further, the angle calculation section 1041 calculates a difference Δθ2 (change in the total angle θ) between the current total angle θ and the stored reference value of the total angle θ when the vehicle is static. For example, when the difference Δθ2 is calculated for the first time after the vehicle 300 stops, the reference value of the total angle θ used at this time is a total angle θ obtained when the difference Δθ1 was calculated, that is, a total angle θ obtained when the vehicle is stopping. When the difference Δθ2 is calculated for the second or following time, the reference value of the total angle θ is a total angle θ obtained when the difference Δθ2 was calculated at the previous time. Then the angle calculation section 1041 adds the difference Δθ2 to the reference value of the vehicle posture angle θv to obtain a new reference value of the vehicle posture angle θ (new θv reference value=θv reference value+Δθ2) and update the reference value of the vehicle posture angle θv therewith.

In the above illustrative embodiment, the acceleration sensor 110 is used as an inclination sensor. However, the inclination sensor may be a gyro sensor (angular velocity sensor or angular acceleration sensor), a geomagnetic sensor, or the like.

What is claimed is:

1. A vehicle lamp control apparatus comprising:
a receiver configured to receive an output value of an inclination sensor and a signal output from at least one of a foot brake sensor, a parking brake sensor and a shift position sensor, wherein a total angle which is an inclination angle of a vehicle with respect to a horizontal plane is derivable from the output value of the inclination sensor, and the total angle includes a road surface angle which is an inclination angle of a road surface with respect to the horizontal plane and a vehicle posture angle which is an inclination angle of the vehicle with respect to the road surface; and
a controller configured to adjust an optical axis angle of a vehicle lamp using the output value of the inclination sensor,
wherein the controller is configured to output an adjustment signal to adjust the optical axis angle of the vehicle lamp in response to change in the total amount when the vehicle is static, except for non-static load change caused by changeover in at least one of a foot brake, a parking brake and a shift position, and
wherein the controller is configured to avoid outputting the adjustment signal or output a maintaining signal to maintain the optical axis angle in response to the non-static load change when the vehicle is static and change in the total angle when the vehicle is running.

2. The vehicle lamp control apparatus according to claim 1, wherein the controller is configured to repeatedly derive the total angle from the output value when the vehicle is static, and
wherein the controller is configured to avoid outputting the adjustment signal or output the maintaining signal in response to change between the total angle derived at a previous time and the total angle derived at a current time when the receiver receives at least one of a changeover signal for the foot brake, a changeover signal for the parking brake and a changeover signal for the shift position in a time period from the previous time of deriving the total angle to the current time of deriving the total angle.

3. The vehicle lamp control apparatus according to claim 2,
wherein the controller is configured to store a reference value of the road surface angle and a reference value of the vehicle posture angle,
wherein when the vehicle is static,
in a case where the receiver does not receive the changeover signal in the period starting from the previous time of deriving the total angle to the current time of deriving the total angle, the controller subtracts the reference value of the road surface angle from the total angle derived at the current time so as to obtain the vehicle posture angle, stores the obtained vehicle posture angle as a new reference value of the vehicle posture angle and outputs the adjustment signal based on the obtained vehicle posture angle or the new reference value of the vehicle posture angle, and in a case where the receiver receives the changeover signal in the period starting from the previous time of deriving the total angle to the current time of deriving the total angle, the controller subtracts the reference value of the vehicle posture angle from the total angle derived at the current time so as to obtain the road surface angle and stores the obtained road surface angle as a new reference value of the road surface angle, and wherein when the vehicle is stopping, the controller derives the total angle from the output value, subtracts the reference value of the vehicle posture angle from the derived total angle to obtain the road surface angle, and stores the obtained road surface angle as a new reference value of the road surface value.

4. The vehicle lamp control apparatus according to claim 1, wherein the controller is configured to avoid outputting the adjustment signal or output the maintaining signal in response to non-static load change caused by changeover in the foot brake when the vehicle is static.

\* \* \* \* \*